US010827546B2

(12) United States Patent
Manolakis et al.

(10) Patent No.: US 10,827,546 B2
(45) Date of Patent: Nov. 3, 2020

(54) TIME SYNCHRONIZATION FOR MULTI-LINK D2D AND CELLULAR COMMUNICATION

(71) Applicant: Huawei Technologies Duesseldorf GmbH, Duesseldorf (DE)

(72) Inventors: Konstantinos Manolakis, Munich (DE); Wen Xu, Munich (DE)

(73) Assignee: Huawei Technologies Duesseldorf GmbH, Duesseldorf (DE)

( * ) Notice: Subject to any disclaimer, the term of this patent is extended or adjusted under 35 U.S.C. 154(b) by 0 days.

(21) Appl. No.: 16/368,420

(22) Filed: Mar. 28, 2019

(65) Prior Publication Data

US 2019/0223241 A1  Jul. 18, 2019

Related U.S. Application Data

(63) Continuation of application No. PCT/EP2016/073339, filed on Sep. 29, 2016.

(51) Int. Cl.
*H04W 76/14* (2018.01)
*H04W 56/00* (2009.01)
*H04W 72/08* (2009.01)
*H04W 88/02* (2009.01)

(52) U.S. Cl.
CPC ......... *H04W 76/14* (2018.02); *H04W 56/002* (2013.01); *H04W 72/085* (2013.01); *H04W 88/02* (2013.01)

(58) Field of Classification Search
None
See application file for complete search history.

(56) References Cited

U.S. PATENT DOCUMENTS

| 2015/0043545 A1* | 2/2015 | Cheng | H04W 56/00 370/336 |
| 2015/0156757 A1* | 6/2015 | Kalhan | H04L 1/1607 370/330 |
| 2015/0181546 A1* | 6/2015 | Freda | H04W 56/0015 370/336 |
| 2015/0215763 A1* | 7/2015 | Ro | H04W 8/005 455/426.1 |

(Continued)

OTHER PUBLICATIONS

Manolakis et al., "Time Synchronization for Multi-Link D2D/V2X Communication", 2016 IEEE 84th Vehicular Technology Conference (VTC-FALL), pp. 1-6 (Sep. 18, 2016).

(Continued)

*Primary Examiner* — Otis L Thompson, Jr.
(74) *Attorney, Agent, or Firm* — Leydig, Voit & Mayer, Ltd.

(57) ABSTRACT

A network apparatus of a cellular network for synchronizing at least one user equipment (UE) for a sidelink, comprising a processor adapted to receive from a first UE which is connected to the cellular network a request to establish a sidelink with at least a second UE, receive from the first UE a connectivity state information, in particular on channel quality, connectivity and/or timing, of the first UE and/or of at least the second UE and instruct the first UE to establish or decline the sidelink after synchronizing according to an action selected by the network apparatus from a plurality of action based on at least one of: the connectivity state and at least one operational condition of the cellular network.

10 Claims, 6 Drawing Sheets

(56) References Cited

U.S. PATENT DOCUMENTS

| | | | | |
|---|---|---|---|---|
| 2015/0271675 | A1* | 9/2015 | Cheng | H04W 8/005 455/410 |
| 2016/0057718 | A1* | 2/2016 | Sorrentino | H04W 76/14 370/350 |
| 2016/0057794 | A1* | 2/2016 | Morita | H04W 76/14 370/329 |
| 2016/0192420 | A1* | 6/2016 | Kim | H04W 74/00 370/329 |
| 2016/0198455 | A1* | 7/2016 | Caretti | H04B 17/318 370/329 |
| 2017/0006568 | A1* | 1/2017 | Abedini | H04W 56/0015 |
| 2017/0019886 | A1* | 1/2017 | Patel | H04W 4/70 |
| 2017/0079035 | A1* | 3/2017 | Seo | H04W 72/1242 |
| 2017/0295554 | A1* | 10/2017 | Lee | H04W 76/14 |
| 2018/0035278 | A1* | 2/2018 | Aminaka | H04W 48/08 |
| 2018/0049235 | A1* | 2/2018 | Baghel | H04W 4/70 |
| 2018/0115930 | A1* | 4/2018 | Belleschi | H04W 36/0072 |
| 2018/0152986 | A1* | 5/2018 | Jung | H04W 48/20 |
| 2018/0199312 | A1* | 7/2018 | Wu | H04W 72/02 |
| 2018/0213500 | A1* | 7/2018 | Li | H04W 56/00 |
| 2018/0242190 | A1* | 8/2018 | Khoryaev | H04L 47/283 |
| 2018/0249462 | A1* | 8/2018 | Blasco Serrano | H04B 7/26 |
| 2018/0295534 | A1* | 10/2018 | Huang | H04W 76/23 |
| 2019/0069247 | A1* | 2/2019 | Wu | H04W 52/0261 |
| 2019/0261322 | A1* | 8/2019 | Xu | H04L 1/1812 |
| 2019/0350024 | A1* | 11/2019 | Abedini | H04W 4/20 |

OTHER PUBLICATIONS

Ericsson, "Sidelink Resource Allocation in V2X", 3GPP Draft, R2-162818, RAN WG2, No. Dubrovnik, Croatia, (Apr. 2, 2016).

Van De Beek, et al., "ML Estimation of Time and Frequency Offset in OFDM Systems", IEEE Transactions on Signal Processing, 45(7): 1800-1805, 6 pages (1997).

Manolakis et al., "A Closed Concept for Synchronization and Cell Search in 3GPP LTE Systems", 2009 IEEE Wireless Communications and Networking Conference, 6 pages (May 12, 2009).

Xu et al., "Robust Synchronization for 3GPP LTE System", 2010 IEEE Global Telecommunications Conference Globecom 2010, 5 pages (Jan. 10, 2011).

Nilsson et al., "Autonomous Synchronization of a DMT-VDSL System in Unbundled Networks", IEEE Journal on Selected Areas in Communications, 20(5): 1055-1063, 9 pages (2002).

Ebner et al., "Aspects of Decentralized Time Synchronization in Vehicular Ad hoc Networks", 1st International Workshop on Intelligent Transportation (WIT 2004), Hamburg, Germany, 6 pages (2004).

Nokia Networks, "Discussion on V2V synchronization source priority", 3GPP TSG-RAN WG1 Meeting #83, Anaheim, USA, R1-157159, 4 pages (Nov. 15-22, 2015).

CATT, "Synchronization enhancements in PC5-based V2V", 3GPP TSG RAN WG1 Meeting #83, Anaheim, USA, R1-156603, 8 pages (Nov. 15-22, 2015).

Huawei, et al., "Synchronization for V2X", 3GPP TSG RAN WG1 Meeting #83, Anaheim, USA, R1-156481, 4 pages (Nov. 15-22, 2015).

ZTE, "Synchronization for V2V", 3GPP TSG-RAN WG1 Meeting #83, Anaheim, USA, R1-156661, 6 pages (Nov. 15-22, 2015).

* cited by examiner

# TIME SYNCHRONIZATION FOR MULTI-LINK D2D AND CELLULAR COMMUNICATION

CROSS-REFERENCE TO RELATED APPLICATIONS

This application is a continuation of International Application No. PCT/EP2016/073339, filed on Sep. 29, 2016, the disclosure of which is hereby incorporated by reference in its entirety.

FIELD

The present disclosure, in some embodiments thereof, relates to synchronizing timing of a plurality of UEs to support sidelink communication and, more specifically, but not exclusively, to synchronizing timing of a plurality of UEs for sidelink communication by selecting an action from a plurality of actions according to a connectivity state of the UEs.

BACKGROUND

One of the key technologies introduced by future wireless networks, and in particular cellular networks such as, for example, 5G (5th generation) cellular networks, is a capability of the UEs to simultaneously maintain a cellular connection and one or more direct device-to-device (D2D) connections for communicating with other UE(s).

The D2D communication may be utilized by a sidelink channel through which the UEs may communicate with one another. The sidelink may be in-band, i.e. share the same frequency band(s) and/or carrier(s) as the cellular network and/or out-of-band, i.e. assigned with frequency band(s) and/or carrier(s) that are not used by the cellular link.

The D2D communication may serve a plurality of existing and/or future applications and may address the need to support connectivity and access for the growing multitude of high mobility UEs, for example, vehicular users and/or network enabled vehicles such as V2V (vehicle to vehicle communication) and/or V2X vehicle to anything communication) capable vehicles.

SUMMARY

According to a first aspect of the disclosure a network apparatus of a cellular network for instructing a user equipment, UE, for a sidelink, comprises a processor configured to receive from a first UE, which is connected to the cellular network, a request to establish or decline a sidelink with a second UE.

Further, the processor is configured to receive from the first UE a connectivity state information, in particular on channel quality, connectivity, and/or timing, of the first UE, which in particular comprises information of the second UE.

And the processor is configured to instruct the first UE based on the connectivity state information to either communicate to the second UE, in particular before or after having established the sidelink connection, or to establish the sidelink with the second UE, or to decline the sidelink with the second UE.

Optionally, the request to the network apparatus is initiated by the first UE, in particular following discovery of the second UE, or by the second UE.

Optionally, the processor is configured to instruct the first UE comprising to decline establishing the sidelink with at least the second UE.

Optionally, the processor is configured to instruct the first UE to establish the sidelink with the second UE, wherein this comprises to provide timing information from the network apparatus to the second UE. This can be done such that the first UE and the second UE synchronize according to the timing information.

Optionally, the processor is configured to instruct the first UE to establish the sidelink with the second UE, wherein this comprises to instruct the second UE to maintain a cellular connection with a network apparatus, e.g. a network apparatus to which the second UE is already connected. This can be done in particular only if a timing difference is below a predefined threshold.

Optionally, the processor is configured to instruct the first UE to establish the sidelink to the second UE, wherein this comprises information to temporarily disconnect a cellular connection to the network apparatus and to use a timing information provided by the second UE such that the first UE and the second UE synchronize according to the timing information from the second UE. This can be done in particularly only if a timing difference is above a predefined threshold level.

Optionally, this instruction can comprise the first UE to maintain a downlink and/or an uplink cellular connection with the network apparatus in particular if the sidelink utilizes a frequency band not used by the respective cellular connection of the downlink and the uplink cellular connections.

Optionally, the processor is configured to instruct the first UE to establish the sidelink using the timing information provided by another network apparatus, in particular the network apparatus to which the second UE is connected, such that the first UE and the second UE synchronize according to the timing information from the other network apparatus. This can be done in particular only if a timing difference is above a predefined threshold level.

Optionally, the processor is configured to instruct the first UE to establish the sidelink using the timing information provided by the network apparatus such that the first UE and at least the second UE synchronize according to the timing information from the network apparatus. This can be done in particular only if a timing difference is above the predefined threshold level.

Optionally, the processor is configured to report to the first UE and, in particular through the first UE, to the second UE an offset with respect to an external time reference for a synchronization of the first UE with the second UE, wherein the external time reference is based on a global positioning system, GPS, a global navigation satellite system, GNSS, a coordinated universal timing, UTC, or any other pre-agreed time reference.

According to a second aspect of the disclosure, a method for instructing a user equipment, UE, unit connecting through a sidelink, comprises receiving from a first UE which is connected to a cellular network a request to establish or decline a sidelink with at least a second UE;

receiving from the first UE a connectivity state information, in particular on channel quality, connectivity and/or timing, of the first UE, which in particular comprises information of the second UE; and instructing the first UE based on the connectivity state information to communicate to the second UE, or to establish the sidelink with the second UE, or to decline the sidelink with the second UE.

According to a third aspect a first UE for managing a sidelink with a second UE, comprises a processor configured to send to a network apparatus a request to establish or decline the sidelink with the second UE.

Further the processor is configured to send to the network apparatus connectivity state information, in particular on channel quality, connectivity and/or timing, of the first UE, which in particular comprises information of the second UE.

And further the processor is configured to receive from the network apparatus based on the connectivity state information an instruction to either communicate to the second UE, or to establish the sidelink with the second UE, or to decline the sidelink with the second UE.

Optionally, the processor is configured to send a request to establish or decline the sidelink to or from a second UE.

Optionally, the processor is configured to to reject a request to establish a sidelink to or from the second UE.

Optionally, the processor is configured to measure an external timing information from a signal received from the second UE and to compare the external timing information with its own timing information and determine a timing offset and further to update an internal timing information based on the timing offset.

Optionally, the processor is configured to communicate the internal timing information to the second UE, which in particular is not connected to the same base station as the first UE.

According to a fourth aspect of the present disclosure a method for operating a first UE for managing a sidelink with a second UE, comprises the steps:

sending to a network apparatus a request to establish or decline the sidelink with the second UE;

sending to the network apparatus connectivity state information, in particular on channel quality, connectivity and/or timing, of the first UE, which in particular comprises information of the second UE; and receiving from the network apparatus based on the connectivity state information an instruction to:
 communicate to the second UE,
 establish the sidelink with the second UE,
 decline the sidelink with the second UE.

Theses aspects and optional features are described in the following in more detail.

According to an aspect of some embodiments of the present disclosure there is provided a network apparatus of a cellular network for synchronizing at least one user equipment, UE, for a sidelink, comprising a processor adapted to:
 Receive from a first UE that is connected to the cellular network a request to establish a sidelink with at least a second UE.
 Receive from the first UE connectivity state information, in particular on channel quality, connectivity and/or timing, of the first UE and/or of at least the second UE.
 Instruct the first UE to establish or decline the sidelink after synchronizing according to an action selected by the network apparatus from a plurality of action based on the connectivity state information and/or one or more operational conditions of the cellular network.

The first UE and at least the second UE utilize an in-band sidelink or an out-of-band sidelink. The in-band sidelink indicates the sidelink is utilized in a frequency band that is utilized by a cellular connection of the UE to the network apparatus. The out-of-band sidelink indicates the sidelink is utilized in a frequency sideband that is out of the frequency band utilized by the cellular connection.

The request to the network apparatus is issued by the first UE following discovery of at least the second UE in the frequency band of the sidelink. Initiation of the process to establish the sidelink originates from the first UE or from the at least second UE.

A first action of the plurality of actions comprises instructing the first UE to decline establishing the sidelink with at least the second UE.

In case at least the second UE is not connected to any network apparatus and a timing difference between a local timing reference of the first UE and a local timing reference of at least the second UE is above a predefined threshold level, the processor takes a second action of the plurality of actions. The second action comprises instructing the first UE to establish the sidelink with at least the second UE by providing timing information to at least the second UE such that the first UE and at least the second UE synchronize according to the timing information originating from the network apparatus.

In case at least the second UE is connected to another network apparatus and a timing offset between a timing of the first UE and the timing of at least the second UE is below a predefined threshold level, the processor takes a third action of the plurality of actions. The third action comprises instructing the first UE to establish the sidelink with at least the second UE and maintain a cellular connection with the network apparatus.

In case at least the second UE is connected to another network apparatus and the timing difference is above the predefined threshold level, the processor takes a fourth action of the plurality of actions. The fourth action comprises instructing the first UE to establish the sidelink by temporarily disconnecting a cellular connection to the network apparatus and using the timing information provided by at least the second UE such that the first UE and at least the second UE synchronize according to the timing information originating from the other network apparatus.

Optionally, the first UE maintains a downlink and/or an uplink cellular connection with the network apparatus while temporarily disconnecting 'in case the sidelink utilizes a frequency band not used by the respective cellular connection of the downlink and the uplink cellular connections.

In case at least the second UE is connected to the other network apparatus and the timing difference is above the predefined threshold level, the processor takes a fifth action of the plurality of actions. The fifth action comprises negotiating with the other network apparatus a handover of the first UE to the other network apparatus to allow the first UE to establish the sidelink using the timing information provided by the other network apparatus such that the first UE and at least the second UE synchronize according to the timing information originating from the other network apparatus.

In case at least the second UE is connected to the other network apparatus and the timing difference is above the predefined threshold level, the processor takes a sixth action of the plurality of actions. The sixth action comprises negotiating with the other network apparatus a handover of at least the second UE to the network apparatus to allow the first UE and at least the second UE to establish the sidelink using the timing information provided by the network apparatus such that the first UE and at least the second UE synchronize according to the timing information originating from the network apparatus.

Optionally, the network apparatus reports to the first UE and at least the second UE an offset with respect to an external time reference to expedite the synchronization with each other. The external time reference may be a global positioning system (GPS), a global navigation satellite system (GNSS) and/or any other pre-agreed time reference, such as a coordinated universal timing (UTC).

Optionally, the first UE and at least the second UE mutually apply an iterative timing synchronization procedure. The iterative timing synchronization procedure comprises the first UE and at least the second UE exchanging a local timing reference with each other such that each one of the first UE and at least the second UE adjusts a local timing reference according to a timing offset detected in the local timing reference received from the other UE. The iterative procedure is repeated until detecting convergence of the local timing reference of the first UE and at least the second UE.

According to an aspect of some embodiments of the present disclosure there is provided method of synchronizing user equipment, UE, units connecting through a sidelink, comprising, comprising:

Receiving from a first UE that is connected to a cellular network a request to establish a sidelink with at least a second UE.

Receiving from the first UE a connectivity state information, in particular on channel quality, connectivity and/or timing, of the first UE and/or of at least the second UE.

Instructing the first UE to establish or decline the sidelink after synchronizing according to an action selected by the network apparatus from a plurality of action based on the connectivity state information and/or one or more operational conditions of the cellular network.

Optionally, the first UE and at least the second UE mutually apply an iterative timing synchronization procedure. The iterative timing synchronization procedure comprises the first UE and at least the second UE exchanging a local timing reference with each other such that each one of the first UE and at least the second UE adjusts a local timing reference according to a timing offset detected in the local timing reference received from the other UE. The iterative procedure is repeated until detecting convergence of the local timing reference of the first UE and at least the second UE.

Optionally, in case one or more of the first UE and at least the second UE maintain a cellular connection to a network apparatus, the respective UE includes timing information received from the network apparatus in the local timing reference transmitted to the one or more other UEs.

According to an aspect of some embodiments of the present disclosure there is provided a first UE for establishing a sidelink with at least a second UE, comprising a processor adapted to:

Send to a network apparatus a request to establish the sidelink with at least a second UE.

Send to the network apparatus connectivity state information, in particular on channel quality, connectivity and/or timing, of the first UE and/or at least the second UE.

Receive from the network apparatus an instruction to establish the sidelink based on the state information.

The processor is configured to send a request to establish the sidelink to at least a second UE.

The processor is configured to accept a request to establish a sidelink from at least the second UE.

The processor is configured to reject a request to establish a sidelink from at least the second UE.

BRIEF DESCRIPTION OF THE SEVERAL VIEWS OF THE DRAWINGS

Some embodiments of the disclosure are herein described, by way of example only, with reference to the accompanying drawings. With specific reference now to the drawings in detail, it is stressed that the particulars shown are by way of example and for purposes of illustrative discussion of embodiments of the disclosure. In this regard, the description taken with the drawings makes apparent to those skilled in the art how embodiments of the disclosure may be practiced.

In the drawings.

DETAILED DESCRIPTION

Figure 1:
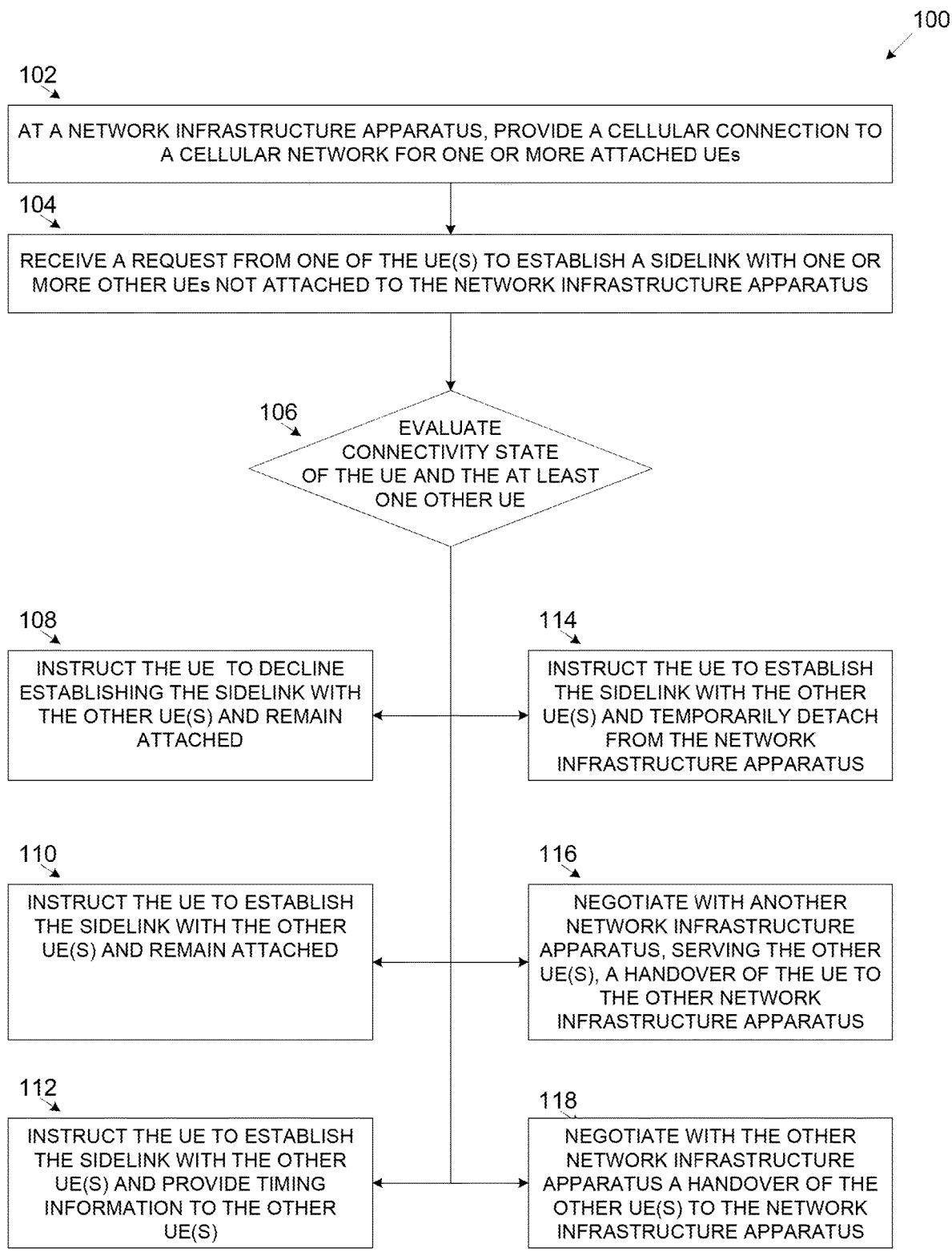
FIG. 1 is a flowchart of an exemplary process for synchronizing timing of a plurality of UEs to support sidelink communication through a selective action process according to a connectivity state of the UE, according to some embodiments of the present disclosure.

The present disclosure, in some embodiments thereof, relates to synchronizing timing of a plurality of UEs for sidelink communication and, more specifically, but not exclusively, to synchronizing timing of a plurality of UEs for sidelink communication by selecting an action from a plurality of actions according to a channel state of the UEs.

The present disclosure presents systems and methods for synchronizing timing of a plurality of UEs to support sidelink communication through a selective action selected according to a connectivity state of synchronizing UE. The timing synchronization is directed towards supporting fast synchronization of the UEs in order for the UEs to setup rapidly the sidelink for supporting ultra-reliable low-latency communication (URLLC) applications. The timing synchronization is conducted by one or more network infrastructure apparatuses serving a plurality of UEs in a wireless network, in particular, a cellular network, for example, a 5G ($5^{th}$ generation) cellular network to support two or more UEs to establish a sidelink for communicating with each other. The network infrastructure apparatus may be for example, a node B, an evolved Node B (eNB), a base station, a radio network controller (RNC) and/or the like. The UEs may be, for example, cellular phones, cellular apparatuses, mobile devices, endpoints, network enabled vehicles (V2V and/or V2X) and/or the like. The UEs are capable of communicating with each other over the sidelink, for example, D2D communication.

In order to establish the sidelink, the UEs trying to establish the sidelink (synchronizing UEs) each having its local timing must first establish a common time reference. The local timing may be based on timing information received from the network infrastructure apparatus serving the respective UE, for example, timing advance (TA). The UE's local timing may also be based on an offset from a time base provided by one or more external sources, for example, a global positioning system (GPS), a global navigation satellite system (GNSS), a coordinated universal time (UTC) and/or the like. The network infrastructure apparatus(s) selects an action from a plurality of actions that best addresses the connectivity state of the UEs to allow the UEs to establish a common timing in order to setup the sidelink connection.

The network infrastructure apparatus(s) employs the selective action process to resolve timing synchronization problems for a plurality of scenarios in which different connectivity and/or timing conditions exist, for example, no and/or partial cellular connectivity (coverage) for one or more of the UEs, UEs connected to non-synchronized network infrastructure apparatuses and/or the like. The network infrastructure apparatus(s) evaluates the connectivity state of the synchronizing UEs in order to select the appropriate action from the plurality of actions. The connectivity state information may include one or more connectivity conditions of the UEs, for example, channel quality, connectivity, timing and/or the like. The channel connectivity may further include one or more operational conditions of the cellular network. The connectivity conditions may indicate, for example, whether the synchronizing UE(s) is connected to one or the network infrastructure apparatuses, cellular signal strength with respect to one or more of the network infrastructure apparatuses and/or the like. The connectivity condition(s) may be obtained by the network infrastructure apparatus(s), for example, directly from the synchronizing UEs, from the synchronizing UEs through other UEs serving as a relay and/or from one or more other network infrastructure apparatuses the synchronizing UE(s). The channel measurements information indicates among other indications, a quality and/or strength of the cellular signal and may include, for example, a timing information, a reference signal received power (RSRP), a reference signal received quality (RSRQ) and/or other measurement related to the cellular channel. The operational conditions of the cellular network may include, for example, a service policy assigned to each of the involved network infrastructure apparatuses, availability of cellular resources of each of the network infrastructure apparatuses and/or the like.

The action the network infrastructure apparatus selects to carry out based on the evaluation of the connectivity state may include instructing the synchronizing UE(s) to, for example, avoid establishing the sidelink, establish the sidelink while maintain the cellular connection with the serving network infrastructure apparatus, establish the sidelink while temporarily disconnecting from the serving network infrastructure apparatus. The action taken by the network infrastructure apparatus may further include, for example, negotiating with one or more other network infrastructure apparatuses a handover of synchronizing UE(s). During the timing synchronization sequence, the UEs may take advantage of external time references, for example, a GPS, a GNSS and/or a UTC to expedite convergence of the timing synchronization with each other.

The present disclosure further presents systems and methods for applying a distributed iterative synchronization procedure (algorithm) by the synchronizing UEs in order to expedite the synchronization process. During distributed iterative synchronization procedure, the synchronizing UEs simultaneously exchange their local timing with one another and each of the UEs adapts it local timing according to offsets from the local timing received from the other synchronizing UE(s). The local timing exchange and adaption may be repeated iteratively until the UEs are synchronized with each other.

The selective action process based on the connectivity state of the UEs to support timing synchronization among the UEs may present significant advantages.

One of the main problems inherent to cellular networks with UEs supporting the D2D communication is making the sidelink, i.e. the D2D communication useful for the URLLC applications, for example, safety application(s), security application(s) and/or the like. Such application may require low latency for communication over the sidelink. The synchronization process of the (synchronizing) UEs that is mandatory for establishing the sidelink may be one of the main time consuming procedures and may therefore introduce considerable latency to the D2D communication.

There are various network deployment scenarios where the synchronization process may require the network infrastructure apparatus(s) to take different measures and/or actions in order to allow the synchronizing UEs to quickly synchronize in order to start communicating over the sidelink. The deployment scenarios may include, for example, synchronizing UEs that are attached to non-synchronized network infrastructure apparatus. Another network deployment scenario may be a case where none of the synchronizing UEs are attached to any network infrastructure apparatus as they may be in a non-coverage area. Yet another scenario may be a partial coverage network deployment in which some of the synchronizing UEs may be attached to the network infrastructure apparatus(s) while other synchronizing UEs are not attached to any network infrastructure apparatus. A combination of any two or more of the exemplary network deployment scenarios described above may also be resolved by applying the selective action process to support timing synchronization of the synchronizing UEs.

One of the problems inherent to the cellular network(s) is relates to coexistence problems that may result from the fact that the cellular connection for uplink/downlink and the sidelink may need to coexist while sharing the same frequency band(s) and/or carrier(s) (in-band) and may therefore interfere with each other. For example, a cellular network using orthogonal frequency division multiplexing (OFDM) waveforms may suffer from inter-symbol interference (ISI) if time offsets of signals transmitted from the UE to the receiving network infrastructure apparatus exceed a predefined threshold level that may typically be duration of the cyclic prefix (CP). This may result from signals overlapping "over the air" and, even if the individual times of arrival may be detected, the signals cannot be processed separately. At the same time, these misalignments cause inter-carrier interference (ICI), as the circular convolution properties between signal and channel are affected in such way that subcarriers' orthogonality and/or other alignment of the subcarriers' is violated. Therefore, for inter-cellular D2D, where UEs are connected to different serving network infrastructure apparatuses, in order to avoid the interferences between the cellular connection(s) and the sidelink, the UEs as well as their serving network infrastructure apparatus(s) will need to be synchronized in terms of timing used for transmission.

However, the network infrastructure apparatuses may be non-synchronized with respect to each other e.g. in a cellular network using frequency division duplex (FDD), even for adjacent cells (coverage areas). Therefore, in case adjacent synchronizing UEs connected to each other through the sidelink acquire their time reference from different serving network infrastructure apparatuses via dedicated synchronization signals, interference may be caused due to synchronization misalignment among the cellular connection(s) and the sidelink connection(s). This may also apply when the serving network infrastructure apparatuses are synchronized but the TA assigned to each of the UEs exceeds the CP duration. Such scenarios are typical for cell-edge UEs where a group of UEs connected through the sidelink advances from one cell towards another cell, for example, vehicular users and or network enabled vehicles such as V2X and/or V2V capable vehicles. This problem may be avoided and/or reduced when the sidelink is out-of-band (i.e. is assigned frequency band(s) and/or carrier(s) that are not used by the cellular link) if a sufficiently large guard band is applied between the frequency band(s) and/or carrier(s). Moreover, the aforementioned interference may still arise in case multiple UEs are connected through multiple sidelink connections and/or employing different sidelink types, for example, unicast, multicast and/or broadcast, in particular when the UEs are connected to different serving network infrastructure apparatuses.

Currently existing methods for solving the synchronization and coexistence problem may apply mechanism(s) for negotiating a common time reference between the network infrastructure apparatuses. The common time reference may require extended reference signals to allow adjustment of each of the involved network infrastructure apparatuses to the common time reference that may lead to increased latency. Furthermore, even if synchronized among them, the common time reference used by the involved network infrastructure apparatuses may not be synchronized with external time reference(s), for example, GPS, GNSS, UTC and/or the like.

The currently existing methods may also overcome the synchronization and coexistence problem by introducing an extended CP for the cellular and/or the sidelink signals that may reduce achievable data throughput and may also lead to an increased latency. Another solution that may be used by the currently existing methods is extending a guard, i.e. a spectral gap between the frequency band(s) and/or carrier(s) used for the cellular link(s) and the sidelink(s). The extended guard band(s) may reduce the utilization of the frequency range assigned to the cellular link and/or the sidelink(s). Using the extended guard band(s) may further reduce the spectral efficiency of the cellular and/or the sidelink channels.

The selective action process to support timing synchronization may resolve the synchronization and coexistence problem by evaluating the connectivity state of the synchronizing UEs and selecting an action from the plurality of actions that best addresses the evaluated connectivity state of the synchronizing UEs. By selecting the preferred action, the synchronization latency may be significantly reduced and hence the overall latency for setting up the sidelink may be significantly reduced making the sidelink, i.e. the D2D communication highly suitable for the URLLC applications.

Furthermore, by applying the distributed iterative synchronization procedure, synchronization process of the synchronizing UEs may be significantly shorter. This may further contribute to reducing the overall latency of setting up the sidelink between the synchronizing UEs.

Before explaining at least one embodiment of the disclosure in detail, it is to be understood that the disclosure is not necessarily limited in its application to the details of construction and the arrangement of the components and/or methods set forth in the following description and/or illustrated in the drawings and/or the Examples. The disclosure is capable of other embodiments or of being practiced or carried out in various ways.

Embodiments of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network, for example, the Internet, a local area network, a wide area network and/or a wireless network.

The computer readable program instructions may execute entirely on the user's computer, partly on the user's computer such as the user equipment (UE), as a stand-alone software package, partly on the user's computer and partly on a remote computer such as the network apparatus or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference is now made to FIG. 1, which is a flowchart of an exemplary process for synchronizing timing of a plurality of UEs to support sidelink communication through a selective action process according to a connectivity state of the UEs, according to some embodiments of the present disclosure. A process 100 is executed by one or more network infrastructure apparatuses of a wireless network, in particular a cellular network serving a plurality of UEs. The process 100 is executed by the network infrastructure apparatus(s) to synchronize timing between a plurality of UEs in order to allow two or more of the UEs to establish a sidelink with each other. The sidelink is a communication channel through which the two or more of the UEs communicate with each other such as, for example, D2D communication. The selective action process is executed to allow fast synchronization of the UEs with each other in order for the UEs to setup rapidly the sidelink for supporting ultra-reliable low-latency communication (URLLC) applications. In order to establish the sidelink, the UEs (synchronizing UEs) trying to establish the sidelink each having its local timing must first establish a common timing. The local timing of the UE may be based on timing information received from the network infrastructure apparatus serving the respective UE, for example, TA. The UE's local timing may also be based on an offset from a time base provided by one or more external sources, for example, a GPS, a GNSS, a UTC and/or the like. The network infrastructure apparatus(s) selects an action from a plurality of prioritized actions that best addresses a connectivity state of the UEs to allow the UEs to establish a common timing in order to setup the sidelink connection. The common timing relates to the timing used by each of the UEs for the cellular and/or the sidelink transmission.

The network infrastructure apparatus(s) employ the selective action process to resolve timing synchronization problems for a plurality of scenarios in which different connectivity and/or timing conditions exist, for example, no cellular connectivity (coverage) for one or more of the UEs, UEs connected to non-synchronized network infrastructure apparatuses and/or the like.

During the timing synchronization sequence, the UEs may take advantage of external time references, for example, a GPS, a GNSS and/or a UTC to expedite convergence of the timing synchronization with each other.

The UEs may further employ a distributed iterative synchronization procedure (algorithm) in which the UEs simultaneously exchanges their local timing with one another and each of the UEs adapts to the local timing received from the other UE(s). The timing exchange and adaption may be repeated iteratively until the UEs are synchronized with each other.

Figure 2:
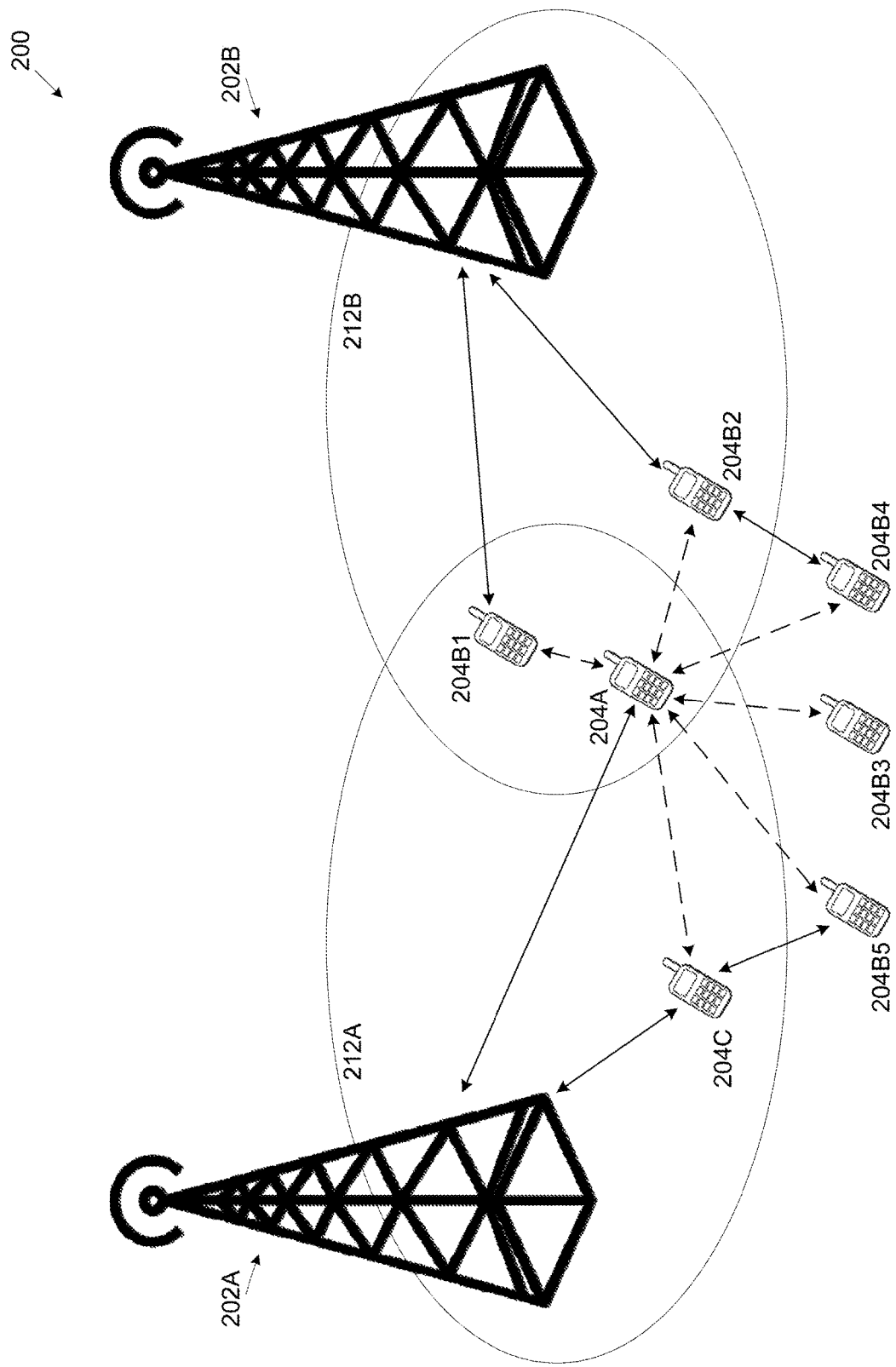
FIG. 2 is a schematic illustration of an exemplary system for synchronizing timing of a plurality of UEs for sidelink communication through selective action process according to a connectivity state of the UE, according to some embodiments of the present disclosure.

Reference is now made to FIG. 2, which is a schematic illustration of an exemplary system for synchronizing timing of a plurality of UEs for sidelink communication through a selective action process according to a connectivity state of the UEs, according to some embodiments of the present disclosure. A system 200 comprises a portion of universal terrestrial radio access network (UTRAN) providing a wireless network, in particular a cellular network, for example, a 5G (5$^{th}$ generation) cellular network and/or the like. The UTRAN may comprise a plurality of network infrastructure apparatuses, for example, a node B, an evolved Node B (eNB), a base station, a radio network controller (RNC) and/or the like connecting to a core of the wireless network. The UTRAN may further include one or more of a plurality of other infrastructure elements, for example, Mobility Management Entities (MME), Serving Gateways (SGW) and/or the like. Typically, the network infrastructure apparatuses are not synchronized with each other, i.e. they may have different timing with respect to each other. However, there may be scenarios when two or more of the network infrastructure apparatuses have a common time base.

Two network infrastructure apparatuses 202A and 202B each provide coverage for the connectivity to the cellular network in coverage areas 212A and 212B respectively. A plurality of UEs 204 may connect to the cellular network through an uplink and/or downlink cellular connections to one or more the network infrastructure apparatuses 202A and/or 202B when located within the coverage area 212A and/or 212B of the respective network infrastructure apparatus(s). The UE 204 may be, for example, a cellular phone, a cellular apparatus, a mobile device, an endpoint, a network enabled vehicle (V2X and/or V2V capable vehicle) and/or the like.

The UEs 204, in particular, UE 204A, UE 204B1, UE 204B2, UE 204B3, UE 204B4 and UE 204C are D2D enabled allowing each of the UEs 204 to communicate directly with one or more of the other UEs 204 over the sidelink channel (referred to as sidelink herein after). The sidelink may be utilized in-band with respect to the cellular connection, i.e. the sidelink communication occupies a frequency band(s) and/or carrier(s) used by the cellular connection, typically the uplink connection. Optionally, the sidelink is out-of-band with respect to the cellular connection, i.e. the sidelink communication is conducted in a frequency band(s) and/or carrier(s) not used by the cellular connection.

Figure 3:
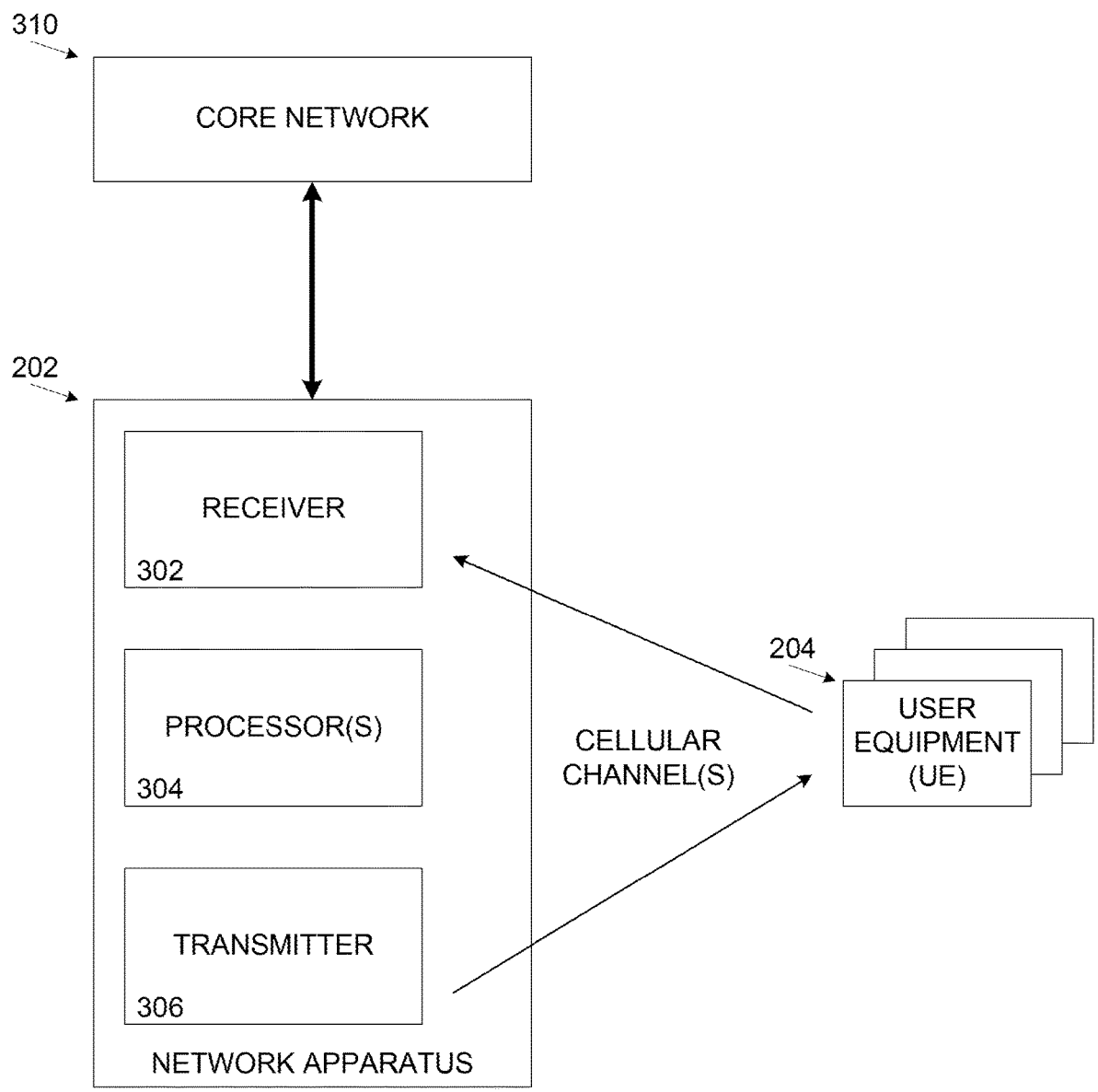
FIG. 3 is a schematic illustration of an exemplary network infrastructure apparatus, according to some embodiments of the present disclosure.

Reference is also made to FIG. 3, which is a schematic illustration of an exemplary network infrastructure apparatus, according to some embodiments of the present disclosure. A network infrastructure apparatus such as the network infrastructure apparatuses 202 is connected to a core network 310 through one or more of the other UTRAN infrastructure elements, for example, the MME, the SGW and/or the like. The network infrastructure apparatuses 202 comprises a receiver 302 and a transmitter 306 for communicating over a cellular channel with the plurality of UEs 204 and a processor(s) 304 for supporting timing synchronization of two or more UEs trying to establish the sidelink with each other. The processor(s) 304 may include one or more processors (homogenous or heterogeneous), which may be arranged for parallel processing, as clusters and/or as one or more multi core processing units. The processor(s) 304 may execute program instructions from one or more storage devices, for example, a volatile memory, a non-volatile memory, a hard drive and/or the like.

Figure 4:
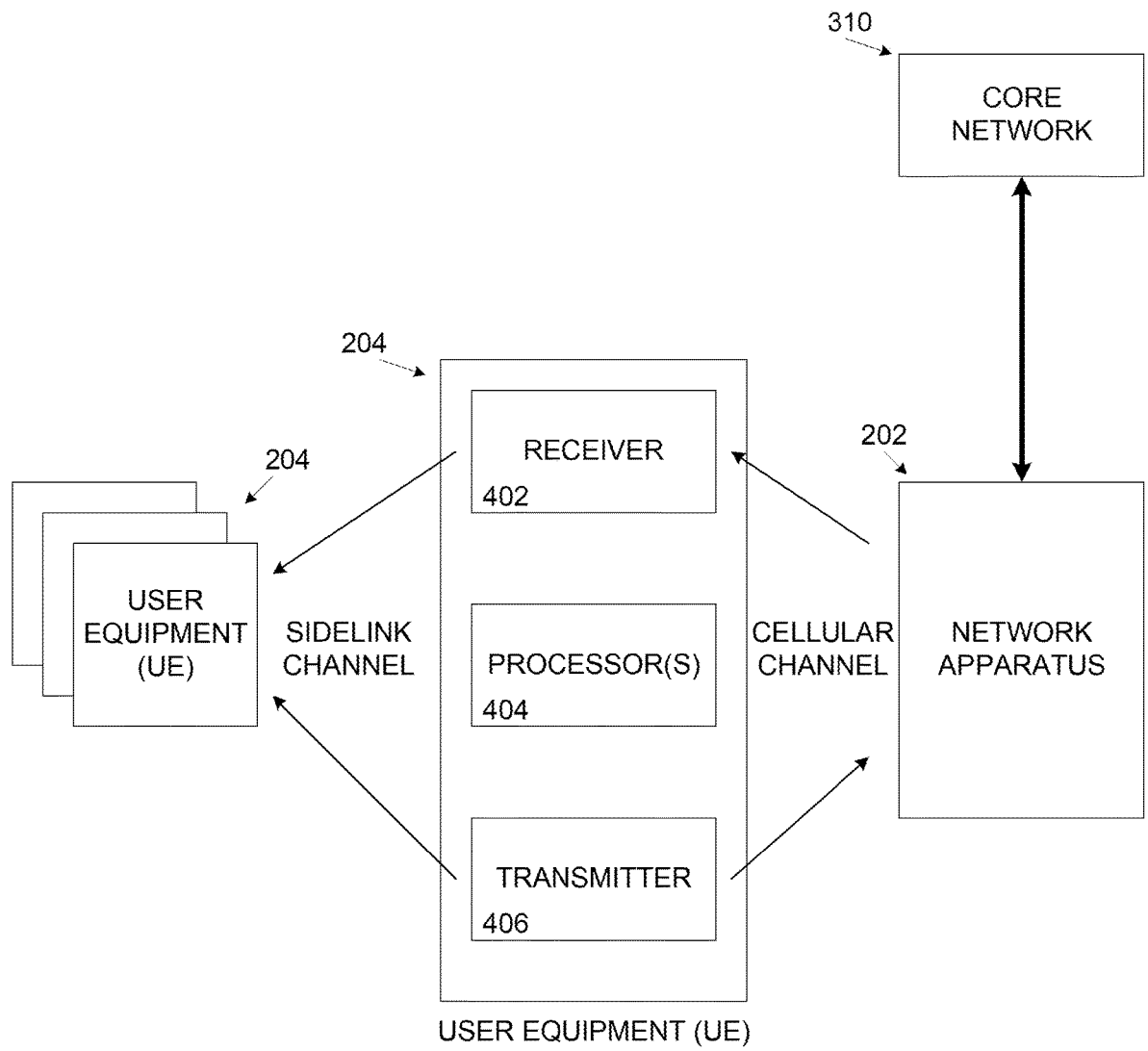
FIG. 4 is a schematic illustration of an exemplary UE, according to some embodiments of the present disclosure.

Reference is also made to FIG. 4, which is a schematic illustration of an exemplary UE, according to some embodiments of the present disclosure. A UE such as the UE 204, for example, the UE 204A, the UE 204B and/or the UE 204C may be adapted to establish a sidelink with one or more of the other UEs 204 by synchronize their timing through a process such as the process 100 in a system such as the system 200. The network infrastructure apparatuses 202 such as, for example, the network infrastructure apparatus 202A and the network infrastructure apparatus 202B are connected to a network core 310.

The UE 204 comprises a receiver 402 and a transmitter 406 for communicating over a cellular channel with the network infrastructure apparatus(s) 202 and a processor(s) 404 for carrying out the instruction(s) provided by the network infrastructure apparatus(s) 202 through the process 100. The receiver 402 and the transmitter 406 also provide communication capabilities for the UE 204 to communicate with one or more other UEs over a sidelink channel that may be in-band and/or out-of-band with respect to the cellular channel.

The processor(s) 404 may include one or more processors (homogenous or heterogeneous), which may be arranged for parallel processing, as clusters and/or as one or more multi core processing units. The processor(s) 404 may execute program instructions from one or more storage devices, for example, a volatile memory, a non-volatile memory, a memory card and/or the like.

Reference is made once again to FIG. 1.

The process 100 may be executed by a network infrastructure apparatus such as the network infrastructure apparatus 202 in a system such as the system 200. While many scenarios may exist, for brevity, the process 100 is presented as executed by the network infrastructure apparatus 202A in order to synchronize timing of a UE such as the UE 204A (a first UE) with one or more of the other UEs (a second UE) such as the UE 204B1, 204B2, 204B3 and/or 204B4. The UE 204A is attached (maintains a cellular connection) to the network infrastructure apparatus 202A while the UEs 204B1 through 204B3 are not attached to the network infrastructure apparatus 202A. The process 100 however may be extended to synchronize the timing with a plurality of additional UEs 204.

The synchronization problem typically arises from the fact that there may be timing offset differences between the different UEs 204, in particular between the UE 204A and the UE 204B, i.e. UE 204B1, 204B2, 204B3 and/or 204B4. If the timing offset exceeds a predefined threshold level, interferences may occur between the sidelink and the cellular connection of the UE 204A and/or the UE 204B. The predefined threshold level is recommended to be lower than the duration of the CP in order to provide a safety margin for synchronization estimation errors.

Naturally, the timing offset problem may be avoided in case the UEs 204 that try to establish the sidelink are attached to the same network infrastructure apparatus since they share a common time base provided by the serving network infrastructure apparatus. For example, the UE 204A and the UE 204C are both within the coverage area 212A of the network infrastructure apparatus 202A and are attached to the network infrastructure apparatus 202A. The timing of both the UE 204A and the UE204C originates from the network infrastructure apparatus 202A and therefore the timing offset is likely to be below the predefined threshold level. The sidelink connection may therefore not interfere with the cellular connection of the UE 204A and/or the UE 204C.

The timing offset may also not present a problem (be below the predefined threshold level) in case the UEs 204 trying to establish the sidelink are attached to different network infrastructure apparatuses 202 that are synchronized with other.

However, in a plurality of scenarios, the timing offset may exceed the predefined threshold level and may therefore lead to interferences between the sidelink and the cellular connection(s). For example, in case UEs 204 trying to establish the sidelink are attached to different network infrastructure apparatuses that are not synchronized, in case one or more of the UEs 204 is in a no coverage area, i.e. not attached to any network infrastructure apparatus 202 and/or the like. The process 100 through the selective action process is directed to resolve the synchronization problem for the plurality of the scenarios discussed herein above.

As shown at 102, the process 100 starts with a network infrastructure apparatus, for example, the network infrastructure apparatus 202A serving one or more attached UEs 204, for example, the UE 204A with a connection to the cellular network. The attached UE 204A may maintain an uplink and/or a downlink cellular connection with the network infrastructure apparatus 202A.

As shown at 104, the network infrastructure apparatus 202A receives from the UE 204A (the first UE) a request to establish the sidelink with one or more of the other UEs (the second UE(s)) 204B1, 204B2, 204B3 and/or 204B4. The UE 204A issued the request after discovering one or more of the UEs 204B1, 204B2, 204B3 and/or 204B4, i.e. receiving synchronization signals from the UEs 204B1, 204B2, 204B3 and/or 204B4. Initiating the setup of the sidelink may originate from the UE 204A and/or from any of the UEs 204B1, 204B2, 204B3 and/or 204B4.

As shown at 106, which is a decision point, the network infrastructure apparatus 202A evaluates a connectivity state of the UE 204A and/or the UE 204B with which the UE 204A tries to establish the sidelink. The connectivity state may be determined according to connectivity state information comprising one or more conditions and/or parameters of the UE 204A and/or the UE 204B, for example, a timing information, channel measurements, connectivity condition of the UE 204A and/or the UE 204B and/or the like.

The connectivity conditions may include, for example, indication that the UE 204B is connected to another network infrastructure apparatus, for example, the network infrastructure apparatus 202B, an indication that the UE 204B is not connected to any network infrastructure apparatus 202, channel measurements information of the UE 204B with respect to one or more network infrastructure apparatuses 202 and/or the like. The channel measurement(s) may indicate among other indications, a quality and/or strength of the cellular signal of the UE 204 with respect to one or more network infrastructure apparatuses 202 and may include, for example, a timing information, a reference signal received power (RSRP), a reference signal received quality (RSRQ) and/or other measurements related to the cellular channel. Each UE 204 periodically reports its channel information to the network infrastructure apparatuses serving it.

While the connectivity state information of the UE 204A may be available to the network infrastructure apparatus 202A directly from the attached UE 204A, the network infrastructure apparatus 202A needs to obtain also the connectivity state information of the UE(s) 204B, for example, the UEs 204B1, 204B2, 204B3 and/or 204B4. The network infrastructure apparatus 202A may obtain the channel state information of the UE(s) 204B through the UE 204A conveying the channel measurements information reported by the UE 204B to the UE 204A over the sidelink. The network infrastructure apparatus 202A may also get the connectivity state information of the UE(s) 204B by exchanging information with the network infrastructure apparatus 202B.

The channel connectivity information may further include one or more operational condition of the cellular network. The operational conditions of the cellular network may include, for example, a service policy assigned to each of the involved network infrastructure apparatus 202A and/or the network infrastructure apparatus 202B, availability of cellular resource of each of the network infrastructure apparatus 202A and/or the network infrastructure apparatus 202B and/or the like.

Based on the evaluation, the network infrastructure apparatus 202A determines the connectivity state of the UE 204A and/or the UE 204B. The network infrastructure apparatus 202A then selects an action from a plurality of actions according to the determined connectivity. The network infrastructure apparatus 202A takes the selected action to support the UE 204A in establishing the sidelink by synchronizing timing with the UE 204B, either UE 204B1, 204B2, 204B3 and/or 204B4.

A shown at 108, according to a first action of the plurality of actions the network infrastructure apparatus 202A instructs the UE to avoid establishing the sidelink with the UE 204B. In case the UE 204B initiated the attempt to establish the sidelink, the UE 204A is instructed to refuse the request from the UE 204B to establish the sidelink. For example, based on the connectivity state of the UE 204A, in particular the channel measurements of UE 204A, the network infrastructure apparatus 202A may evaluate that the sidelink may experience a low signal to interference plus noise ratio (SINR), that may not allow for robust data transmission. Based on the low SINR evaluation, the network infrastructure apparatus 202A may instruct the UE 204A to decline the sidelink with the UE 204B.

As shown at 110, according to a second action of the plurality of actions the network infrastructure apparatus 202A instructs the UE 204A to establish the sidelink with the UE 204B while both the UE 204A and the UE 204B remain attached to their respective network infrastructure apparatus 202. The network infrastructure apparatus 202A may take this action when the timing offset between the timing of the UE 204A and the UE 204B is below the predefined threshold level.

The timing offset may be below the predefined threshold level in a plurality of scenarios, for example, the UE 204B such as, for example, UE 204B1 and/or UE 204B2 is attached (maintains a cellular connection) to the network infrastructure apparatus 202B and the network infrastructure apparatus 202A and the network infrastructure apparatus 202B are synchronized. However, it is possible that the timing offset is below the predefined threshold level even if the network infrastructure apparatus 202A and the network infrastructure apparatus 202B are synchronized and therefore the network infrastructure apparatus 202A may instruct the UE 204A to establish the sidelink while remaining attached.

These scenarios may apply to the UE 204A when trying to establish the sidelink with the UE U204B4 similarly to the when trying to connect to the UE 204B1 and/or the UE 204B2. Even though the UE 204B4 is not directly attached (maintains a cellular connection) to the network infrastructure apparatus 202B, it may be served by the network infrastructure apparatus 202B though a sidelink connection to, for example, the UE 204B2 serving as a relay. The timing of the UE 204B4 therefore originates from the network infrastructure apparatus 202B and as such the same synchronization issues that may arise between the UE 204A and the UE 204B1 and/or the UE 204B2 may be applicable for the UE 204B4.

Another example that was discussed is when the UE2 204A and the UE 204C try to establish the sidelink. In such case as both the UE 204A and the UE 204C are attached to the same network infrastructure apparatus 202A that provides the timing for both the UE 204A and the UE 204C, the timing offset is likely to be below the predefined threshold level. However, this scenario may be further extended, for example, the UE 204B5 tries to establish the sidelink with the UE 204A. While the UE 204B5 is not directly attached to the network infrastructure apparatus 202A as it is out of the coverage area 212A, the UE 204B5 may be connected by the sidelink to another UE 204, for example, UE 204C that is attached to the network infrastructure apparatus 202A. The UE 204B5 may therefore be served by the network infrastructure apparatus 202A through the UE 204C performing as a relay. In such a setup the timing used by the UE 204B5 for the sidelink with the UE 204C may be based on timing originating from the network infrastructure apparatus 202A. Therefore it is likely that the timing offset between the UE 204A and the UE 204B5 is below the predefined threshold level since the timing for both the UE 204A and the UE 204B5 originates from the network infrastructure apparatus 202A.

Yet another example, may be a scenario where the UE 204A and the UE 204B, for example, the UE 204B1 (and/or the UE 204B2) are attached to the network infrastructure apparatus 202A and the network infrastructure apparatus 202B respectively but establish the sidelink that is out-of-band, i.e. the sidelink and the cellular connection do not interfere with each other.

A shown at 112, according to a third action of the plurality of actions the network infrastructure apparatus 202A instructs the UE 204A to establish the sidelink with the UE 204B and provide timing information to the UE 204B. The network infrastructure apparatus 202A may take this action in case the timing offset exceeds the predefined threshold level and the UE 204B is not attached to any network infrastructure apparatus 202, for example, the UE 204B3. The UE 204B3 timing may be based on a local timing that may be based on an internal timing mechanism that is not synchronized to any external time base. Optionally, The UE 204B3 timing may be based on one or more external sources, for example, a GPS, a GNSS, a UTC and/or the like.

The timing information the UE 204A is instructed to provide to the UE 204B3 may include timing based on, for example, the TA assigned to the UE 204A by the network infrastructure apparatus 202A. Since the UE 204B3 is not attached to any network infrastructure apparatus 202 it may adopt to the timing provided by the UE 204A such that the UE 204A and the UE 204B3 are synchronized according to the timing provided by network infrastructure apparatus 202A and establish the sidelink.

As shown at 114, according to a fourth action of the plurality of actions the network infrastructure apparatus 202A instructs the UE 204A to temporarily disconnect from the network infrastructure apparatus 202A and establish the sidelink with the UE 204B. The network infrastructure apparatus 202A may take this action in case the timing offset exceeds the predefined threshold level and the UE 204B is attached (maintains a cellular link) with another network infrastructure apparatus 202, for example, the UE 204B1 and/or the UE 204B2. Furthermore, this action may be taken based on the operational conditions, for example, the cellular resources of the network infrastructure apparatus 202A are insufficient to serve the UE 204B and/or the cellular resources of the network infrastructure apparatus 202B are insufficient to serve the UE 204A.

Since the UE 204A and the UE 204B1 (and/or the UE 204B2) are each connected to the network infrastructure apparatus 202A and the network infrastructure apparatus 202B respectively that may not be synchronized the timing offset may exceed the predefined threshold level. Based on the evaluation of the connectivity state of the UE 204A and the UE 204B1/204B2, the network infrastructure apparatus 202A may determine that the UE 204B 1/204B2 may not be detached from the network infrastructure apparatus 202B. In such case, the network infrastructure apparatus 202A may instruct the UE 204A to temporarily detach (disconnect the cellular connection) from the network infrastructure apparatus 202A in order to adapt to the timing of the UE 204B1/204B2 using timing information provided by the UE 204B1/204B2. The timing information provided by the UE 204B1/204B2 naturally originates from the network infrastructure apparatus 202B and may include, for example, the TA assigned to the UE 204B1/204B2. Once the UE 204A synchronizes to the UE 204B1 the UE 204A and the UE 204B1/204B2 may establish the sidelink.

Optionally, the UE 204A maintains at least a downlink and/or an uplink cellular connection with the network infrastructure apparatus 202A while temporarily detaching. In some scenarios, the sidelink may utilize the frequency band of only one of the downlink and the uplink connections. In such case the network infrastructure apparatus 202A may instruct the UE 204A to disconnect the respective cellular connection interfering with the sidelink and maintain the other cellular connection.

A shown at 116, according to a fifth action of the plurality of actions the network infrastructure apparatus 202A negotiates a handover of the UE 204A to the network infrastructure apparatus 202B. The network infrastructure apparatus 202A may take this action in case the timing offset exceeds the predefined threshold level and while the UE 204B is attached (maintains a cellular link) to another network infrastructure apparatus 202, for example, the UE 204B1, the UE 204A is within the coverage range 212B of the network infrastructure apparatus 202B. Since the UE 204A is within the coverage range 212B, the UE 204A may attach to the network infrastructure apparatus 202B servicing the cellular network. Furthermore, this action may be taken based on the operational conditions, for example, the cellular resources of the network infrastructure apparatus 202A are insufficient to serve the UE 204B.

Once the UE 204A is handed over to the network infrastructure apparatus 202B, the UE 204A and the UE 204B, for example, the UE 204B1 and/or the UE 204B2 may be synchronized with each other based on timing information originating from the network infrastructure apparatus 202B. The timing information may include, for example, the TA assigned to each of the UE 204A and the UE 204B1 (and/or the UE 204B2). The UE 204A may be handed over also when trying to establish the sidelink with the UE U204B4 similarly to the when trying to connect to the UE 204B1 and/or the UE 204B2 since even though the UE 204B4 is not directly attached to the network infrastructure apparatus 202B it uses timing originating from the network infrastructure apparatus 202B.

A shown at 118, according to a sixth action of the plurality of actions the network infrastructure apparatus 202A negotiates a handover of the UE 204B to the network infrastructure apparatus 202A. The network infrastructure apparatus 202A may take this action in case the timing offset exceeds the predefined threshold level and while the UE 204B is attached (maintains a cellular link) to another network infrastructure apparatus 202, for example, the UE 204B1, the UE 204B1 is also within the coverage range 212A of the network infrastructure apparatus 202A. Since the UE 204B1 is within the coverage range 212A, the UE 204B1 may attach to the network infrastructure apparatus 202A servicing the cellular network. Furthermore, this action may be taken based on the operational conditions, for example, the cellular resources of the network infrastructure apparatus 202B are insufficient to serve the UE 204A.

Once the UE 204B1 is handed over to the network infrastructure apparatus 202A, the UE 204A and the UE 204B1 may be synchronized based on timing information originating from the network infrastructure apparatus 202A, for example, the TA assigned to each of the UE 204A and the UE 204B1.

Optionally, during any stage of the timing synchronization sequence as described in the steps 108 through 118 of the process 100, the UEs 204 may report their local timing with respect to one or more of the external timing sources, for example, the GPS, the GNSS, the UTC and/or the like to expedite convergence of the synchronization sequence. Using the external timing source(s) may allow the synchronizing UEs 204 to adapt mutually to the timing of the other UE(s) 204 more rapidly.

Optionally, during any stage of the timing synchronization sequence as described in the steps 108 through 118 of the process 100, the UEs 204 may mutually apply the distributed iterative timing synchronization procedure (algorithm) in order to expedite convergence of the synchronization sequence. The distributed iterative timing synchronization procedure comprises an algorithm in which each of the synchronizing UEs 204, for example, the UE 204A and the UE 204B exchange their local timing with the other UE(s) 204 and mutually adapt to the received timing. The timing exchange and adoption may be repeated until the timing of the synchronizing UEs 204 converges.

The distributed iterative synchronization procedure may be applied by the synchronizing UEs 204 for scenarios in which the synchronizing UEs 204 are not attached to any of the network infrastructure apparatus 202, i.e. out of coverage, and/or do not have access to any other external synchronization source such as GNSS. The distributed iterative synchronization procedure is based on synchronization signals exchanged between the synchronizing UEs 204 that are detected by the other synchronizing UEs 204 to measure the relative timing offsets between the synchronizing UEs 204. Based on the measured timing offsets, the synchronizing UEs 204 adjust their own local timing reference according to a weighted mean of the observed timing offsets (differences) and converge to a common time reference after one or more iterations.

It may be presented that following the one or more iterations the local timing of each of the synchronizing UEs 204 converges to the weighted mean of the observed timing offsets. To present this, it is assumed that two synchronizing UEs 204, for example, the UE 204A and the UE 204B indexed with indices i and j respectively are trying to synchronize with each other in order to establish the sidelink. The relative time offset (difference) between the local timing of the UE 204A and the UE 204B is designated $\Delta t_{ij}$. The absolute time offset of each of the UEs 204A and UE 204B with respect to an ideal network time reference is designated $\Delta t_i$ and $\Delta t_j$ respectively. At a receiver side, for example, the UE 204B, the relative time offset may be measured by the difference between the time instant of an arrival of a predefined synchronization sequence (signal) from the transmitter, for example, the UE 204A and the time instant in which the predefined synchronization sequence should occur according to the local timing reference of the UE 204B. An estimated relative time offset $\hat{\Delta t}_{ij}$ may be biased by the propagation delay time $$\frac{d_{ij}}{c}$$

where d is the distance between the UE 204A and the UE 204B and c is the speed of light, by the timing advance assigned to the UE 204A $t_{TA,i}$ used by transmitting UE 204A and by the estimation error $\zeta_{ij}$. The estimated relative time offset $\hat{\Delta t}_{ij}$ calculated by the receiver, UE 204B, may be expressed through equation 1 shown below.

$$\hat{\Delta t}_{ij} = \Delta t_j - \left( \Delta t_j + \frac{d_{ij}}{c} + t_{TA,i} + \zeta_{ij} \right) \quad \text{Equation 1}$$

$$\text{where } \left( \Delta t_j + \frac{d_{ijc}}{c} + t_{TA,i} + \zeta_{ij} \right)$$

is the estimated time offset.

During every iteration (update cycle) the UE 204B receives $N_t$ synchronization signals and updates its local time reference according to equation 2 below.

$$\Delta t_{j,new} = \Delta t_{j,old} - \frac{\beta}{N_t \cdot \bar{\omega}} \sum_{n=1}^{N_t} \omega_n \cdot \hat{\Delta t}_{ij,n} \quad \text{Equation 2}$$

where $\Delta t_{j,new}$ is the local time offset of the UE 204B calculated during the current iteration, $\Delta t_{j,old}$ is the local time offset of the UE 204B calculated during the previous iteration, $0 < \omega_n < 1$ is selected such that expression converges, $\bar{\omega}$ is a weighted mean of $\omega_n$ and $0 < \beta < 1$ is a global weighting factor.

In the steady state, after the distributed iterative synchronization procedure has converged and both UEs 204A and 204B have mutually adjusted their local timing reference with $N_t=1$, the residual timing error (offset) $\Delta t_{ij}^{ss}$ is as expressed in equation 3 below.

$$\Delta t_{ij}^{ss} = \frac{d_{ij}}{c} + \zeta_{ij} \quad \text{Equation 3}$$

The above scenario may be extended for multiple synchronizing UEs 204 that are all adjusting their local time reference. It may be shown that the residual timing error $\Delta t_{ij}^{ss}$ between every two UEs 204 i and j of the multitude of synchronizing UEs 204 is users will be as expressed in equation 4 below.

$$\Delta t_{ij}^{ss} = \frac{\bar{d}}{c} + \bar{\zeta}_{ij} \quad \text{Equation 4}$$

here $\bar{\zeta}_{ij}$ is the mean of the estimation errors estimation error $\zeta_{ij}$ between the receiver UE 204j and each of the multitude of synchronizing UEs 204 and $\bar{d}$ is the mean of the distance d of the receiver UE 204j from each of the multitude of synchronizing UEs 204.

The distributed iterative synchronization procedure may be further extended to scenarios in which the one or more of the synchronizing UEs 204 attached to one or more of the network infrastructure apparatus 202 (in coverage) while one or more of the other synchronizing UEs 204 other are not attached to any of the network infrastructure apparatus 202 (out of coverage). The in coverage synchronizing UE(s) 204 may use a fixed time reference, for example, the timing information provided by one of the network infrastructure apparatuses 202, for example, the TA that may be assumed as constant during each of the iterations (update cycle).

As shown above, for the out of coverage scenario(s), during the distributed iterative synchronization procedure the relative error is estimated. However, for the partial coverage scenario(s) the timing may need to be evaluated with respect to an absolute error. Naturally, in the steady state, after the synchronizing UEs 204 are synchronized with each other, there a time drift is not likely to appear between the synchronized UEs 204 since the UE(s) 204 using the fixed time reference may not allow the other UE(s) 204 (not using the fixed time reference) to drift away. Therefore, only the residual timing error $\Delta t_{ij}^{ss}$ may remain in the steady state.

For a UE 204i locked to a fixed time reference with accuracy $\Delta t_i$ and using the $t_{TA,i}$ assigned to the UE 204i by the serving network infrastructure apparatus 202, the residual timing error $\Delta t_j^{ss}$ of a UE 204j may be expressed in equation 5 below.

$$\Delta t_j^{ss} = \frac{d_{ij}}{c} + \bar{\zeta}_{ij} + \Delta t_i + t_{TA,i} \quad \text{Equation 5}$$

As evident from the equation 5, the fixed timing error $\Delta t_i$ of the UE 204i as well as the TA value $t_{TA,i}$ affect directly the final error of the UE 204j.

However, these effects may be overcome if the timing information exchanged between the synchronizing UEs 204 includes the TA such that the TA is part of the transmitted local time reference, as it may be needed for aligning the sidelink with the uplink and/or downlink cellular connections in order to avoid interference.

Including the TA in the exchanged local time reference may be mathematically equivalent to adjusting the local time reference of the transmitting UE 204i with the $t_{TA,i}$ to create an adjusted $\Delta t_i'$ as expressed in equation 6 below.

$$\Delta t_i' = \Delta t_i + t_{TA,i} \quad \text{Equation 6:}$$

For the general case in which multiple synchronization signals $N_i > 1$ are received at the UE 204j from multiple transmitting UEs 204 $N_i > 1$ during one of the iterations (update cycle), the residual error $\Delta t_j^{ss}$ may be expressed as shown in equation 7 below.

$$\Delta t_j^{ss} = \frac{1}{N_i} \sum_{i=1}^{N_i} \left( \frac{d_{ij}}{c} + \Delta t_i + t_{TA,i} + \bar{\zeta}_{ij} \right) - t_{TA,j} \quad \text{Equation 7}$$

Where $t_{TA,i}$ denotes the TA, which the network infrastructure apparatus 202 serving the UE 204j serving the UE 204j assigns to the UE 204j based on the location of the UE 204j.

For a sufficiently large number of uniformly distributed UEs 204 around the UE 204j, the weighted sum of the TA values may be approximated as expressed in equation 8 below.

$$t_{TA,j} \approx \frac{1}{N_i} \sum_{i=1}^{N_i} t_{TA,i} \quad \text{Equation 8}$$

This means that UE 204j may be able to align its transmission with respect to the network reference with a residual error $\Delta t_j^{ss}$ as expressed in equation 9 below.
will be then $$\Delta t_j^{ss} \approx \frac{1}{N_i} \sum_{i=1}^{N_i} \left( \frac{d_{ij}}{c} + \Delta t_i + \bar{\zeta}_{ij} \right) \quad \text{Equation 9}$$

The fact that the distributed iterative synchronization procedure converges and remaining time drift is apparent at the steady state may allow synchronizing UE(s) 204 that are out of coverage to mutually synchronize and at the same time align their sidelink transmissions with respect to the cellular uplink and/or downlink transmissions of nearby synchronizing UE 204 that are in coverage.

Performance of the distributed iterative synchronization procedure was evaluated for two scenarios, a no coverage scenario where all the synchronizing UEs 204 are out of coverage and a partial coverage scenario where one or more of the synchronizing UEs 204 are in coverage while other one or more of the synchronizing UEs 204 are out of coverage. Furthermore, some of the synchronizing UEs 204 that are in coverage may include in their transmitted local timing a reference to the GNSS.

Table 1 below lists parameters relating to typical accuracies of synchronization sources and terminal-side estimation errors.

The evaluation relies on $10^3$ i.i.d. realizations, where the UEs 204 may be vehicular users that are distributed around an intersection, with an average density per area and an exponential decay of users' density with the distance from the intersection.

TABLE 1

| Parameter | Value | | |
|---|---|---|---|
| | In coverage | GNSS | Out of coverage |
| Number of UEs 204 (out of coverage) | 0 | 0 | 5/10/30 |
| Number of UEs 204 (partial coverage) | 5/10 | 5/10 | 20/10 |
| Source rms error ($\Delta t_i$) | 5/10 | 5/10 | 20/10 |
| Time reference update | no | no | yes |
| Estimation rms error ($\zeta_{ij}$) | 10 ns | — | 10 ns |
| Weighting factors ($\omega$) | 0.25 | 0.5 | 0.05 |
| Global weighting ($\beta$) | 0.3 | | |
| Distance between UEs 204 | Up to 300 meters | | |

During the distributed iterative synchronization procedure, the out of coverage UE(s) 204 that have no access to the GNSS timing (and therefore do not rely on the GNSS timing) update their local time reference based on sidelink synchronization signals received from one or more other UEs 204. The sidelink synchronization signals may be weighted differently according to a type of the synchronization source. For example, received sidelink synchronization signals containing timing information that is obtained by the transmitting UE(s) 204 from the GNSS are weighted with a factor of 0.5. Sidelink synchronization signals received from in coverage synchronizing UE(s) 204 may be weighted, for example, with a factor of 0.25 and sidelink synchronization signals received from out of coverage synchronizing UE(s) 204 may be weighted, for example, with a factor of 0.05. It is assumed that the sidelink synchronization signals are transmitted from all the synchronizing UEs 204 during each iteration (update cycle) to allow each of the synchronizing UEs 204 to update their local timing reference in every iteration.

In order to have a symmetric scenario (for each of the two scenarios), the reference UE 204 considered for the evaluation is placed at the middle of the intersection.

Figure 5A:
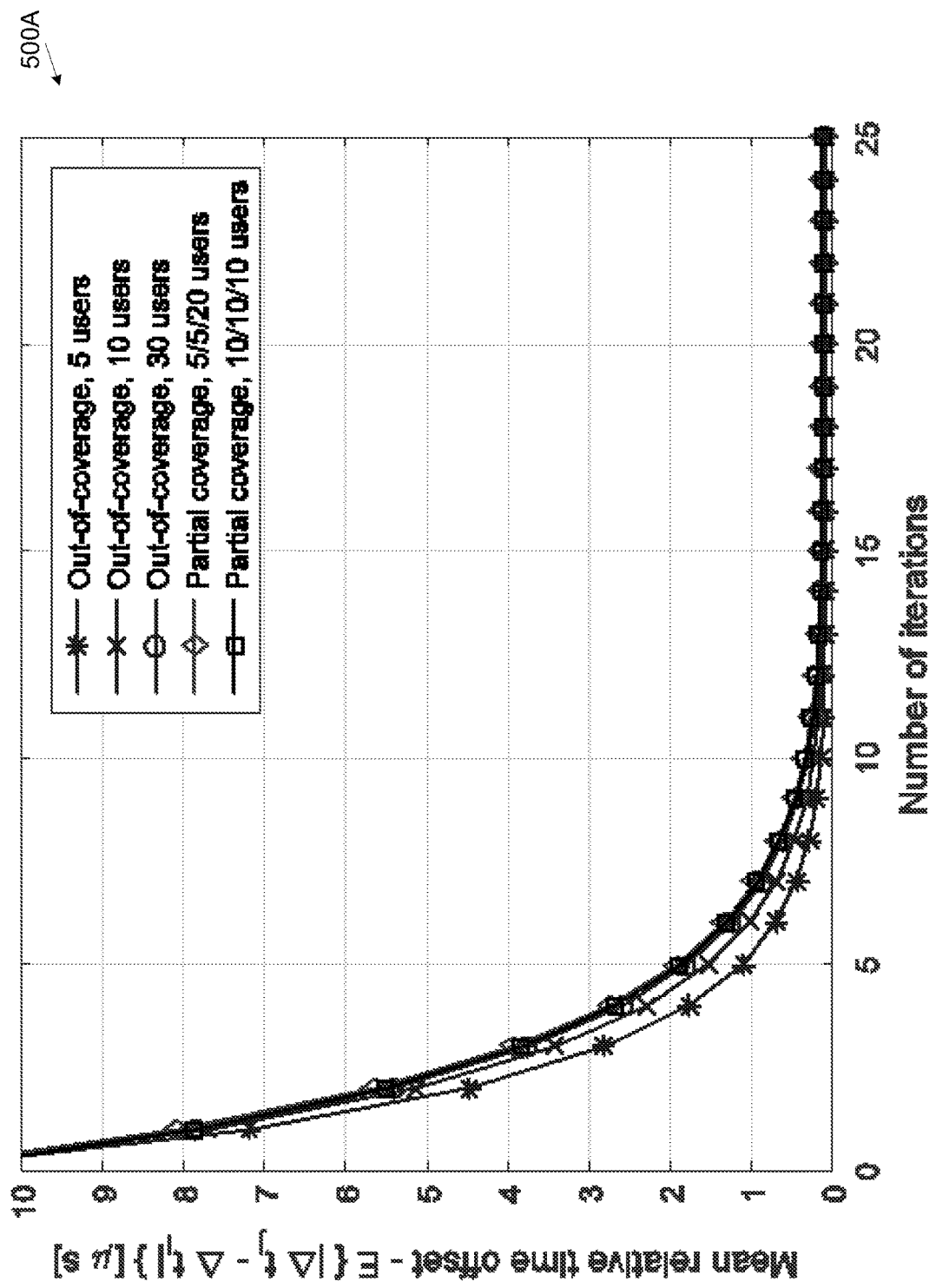
FIG. 5A is an exemplary graph of timing convergence performance in terms of a relative timing error between a plurality of UEs that are out of coverage or partially in and out of coverage and employing a distributed iterative synchronization procedure, according to some embodiments of the present disclosure.
Figure 5B:
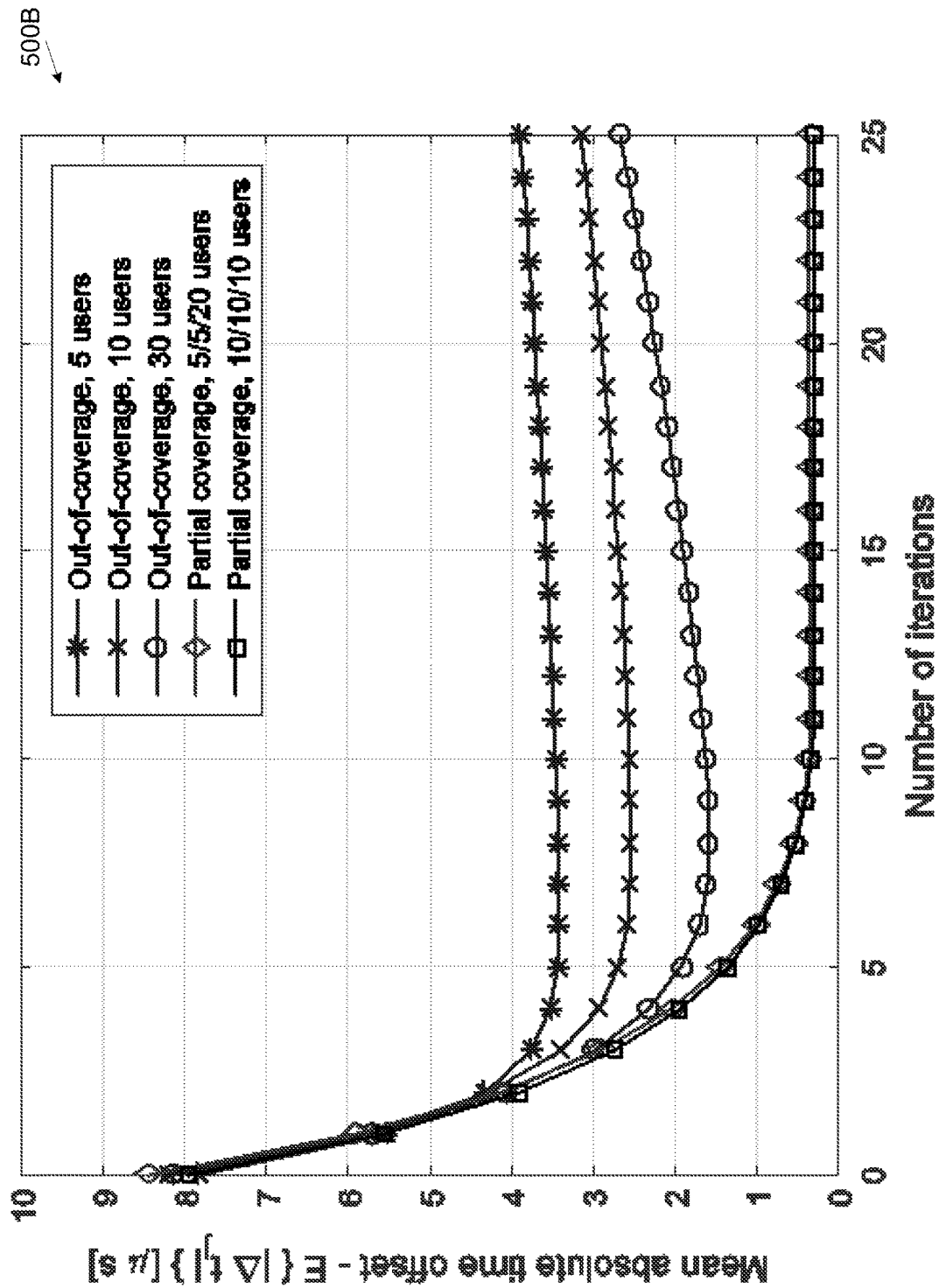
FIG. 5B is an exemplary graph of timing convergence performance in terms of an absolute timing error between a plurality of UEs and an ideal network reference for UEs that are out of coverage or partially in and out of coverage and employing a distributed iterative synchronization procedure, according to some embodiments of the present disclosure.

Reference is now made to FIG. 5A, which is exemplary graph of timing convergence performance in terms of a relative timing error between a plurality of UEs that are out of coverage or partially in and out of coverage and employing a distributed iterative synchronization procedure, according to some embodiments of the present disclosure; and Reference is also made to FIG. 5B, which is an exemplary graph of timing convergence performance in terms of an absolute timing error between a plurality of UEs and an ideal network reference for UEs that are out of coverage or partially in and out of coverage and employing a distributed iterative synchronization procedure, according to some embodiments of the present disclosure.

Both the graphs 500A and 500B present timing convergence performance for a reference UE 204 with a plurality of synchronizing UEs 204 for scenarios where the UEs 204 are out of coverage and/or in partial coverage, i.e. some of the UEs 204 are in coverage while other UEs 204 are out-of-coverage.

Although all the UEs 204 transmit sidelink synchronization signals, only out of coverage UE(s) 204 update their local timing reference based on the received signals, while in-coverage UE(s) 204 and/or UE(s) 204 with access to GNSS do not. For no coverage scenarios, the relative timing error is a sufficient figure of merit, whereas for partial coverage scenarios, the absolute timing error w.r.t. the ideal reference needs to be considered.

The graph 500A presents the timing convergence performance between the reference UE 204 and other synchronizing UE(s) 204 in terms of the relative mean time offset $E\{|\Delta t_j - \Delta t_i|\}$ (axis y) in microseconds (μs) with respect to the number of iterations (axis x).

The graph 500B presents the timing convergence performance between the reference UE 204 and other synchronizing UE(s) 204 in terms of the absolute mean time offset $E\{|\Delta t_i|\}$ (axis y) in microseconds (μs) with respect to the number of iterations (axis x).

As shown in the graph 500A, the timing convergence is a little slower for networks having more synchronizing UEs 204 compared to the faster timing convergence exhibited for networks having less UEs synchronizing 204 As can be seen from the graph 500A the number of the in coverage UEs 204 and/or the number of GNSS equipped UEs 204, for example, 5 or 10 does not significantly influence the overall timing convergence performance. In all evaluated cases and constellations, the residual relative time offset is below 0.2 us. It is noted that, as only out of coverage UEs update their timing, these are the ones considered for numerical evaluation.

As shown in the graph 500B, the absolute timing with respect to the ideal network reference does not converge for the synchronizing UE(s) 204 in a no coverage scenario where none of the UEs 204 has access to the external timing references, for example, the GNSS. The timing does not converge even though synchronizing UE(s) 204 apply the distributed iterative synchronization procedure due to a common time drift that occurs while each of the synchronizing UEs 204 attempts to compensate to the propagation delays since none of the synchronizing UE(s) 204 has access to a fixed time reference.

The common time drift may not present a problem for out of coverage scenarios, as only the relative timing error is important (which converges, as shown in FIG. 500A). In case a subset of the synchronizing UE(s) 204 is locked to the fixed reference(s), for example, the GNSS and/or the TA available for the in coverage UE(s) 204, the common time drift may present a problem.

However, this common time drift is prevented when in coverage UE(s) 204 and/or UE(s) 204 having GNSS capability are present, as shown in the graph 500B. The common time drift may be avoided and/or reduced as the UEs 204 that are in coverage and/or the UE(s) 204 with the GNSS capability prevent the UE(s) 204 that are out of coverage from drifting away. The in coverage UE(s) 204 and/or the GNSS capable UE(s) 204 may provide the out of coverage UE(s) 204 with the timing information of the fixed reference(s) included in the local timing reference exchanged between the UEs 204. In this scenario, the residual timing error in the steady state may comprise a quasi-constant error. The quasi-constant error as presented in the graph 500B is below 0.5 us may depend on one or more characteristics of the received sidelink synchronization signals. The received sidelink synchronization signals characteristics may include, for example, an accuracy of the synchronization sources (TA, GNSS, GPS and/or the like), a receiver-side estimation errors and/or radio wave propagation times that arise according to the distance between the synchronizing UE(s) 204.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

It is expected that during the life of a patent maturing from this application many relevant D2D connectivity interface will be developed and the scope of the term D2D connectivity interface respectively are intended to include all such new technologies a priori.

As used herein the term "about" refers to ±10%.

The terms "comprises", "comprising", "includes", "including", "having" and their conjugates mean "including but not limited to". This term encompasses the terms "consisting of" and "consisting essentially of".

The phrase "consisting essentially of" means that the composition or method may include additional ingredients and/or steps, but only if the additional ingredients and/or steps do not materially alter the basic and novel characteristics of the claimed composition or method.

As used herein, the singular form "a", "an" and "the" include plural references unless the context clearly dictates otherwise. For example, the term "a compound" or "at least one compound" may include a plurality of compounds, including mixtures thereof.

The word "exemplary" is used herein to mean "serving as an example, instance or illustration". Any embodiment described as "exemplary" is not necessarily to be construed as preferred or advantageous over other embodiments and/or to exclude the incorporation of features from other embodiments.

The word "optionally" is used herein to mean "is provided in some embodiments and not provided in other embodiments". Any particular embodiment of the disclosure may include a plurality of "optional" features unless such features conflict.

Throughout this application, various embodiments of this disclosure may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

Whenever a numerical range is indicated herein, it is meant to include any cited numeral (fractional or integral) within the indicated range. The phrases "ranging/ranges between" a first indicate number and a second indicate number and "ranging/ranges from" a first indicate number "to" a second indicate number are used herein interchangeably and are meant to include the first and second indicated numbers and all the fractional and integral numerals there between.

It is appreciated that certain features, which are, for clarity, described in the context of separate embodiments, may also be provided in combination in a single embodiment. Conversely, various features, which are, for brevity, described in the context of a single embodiment, may also be provided separately or in any suitable subcombination or as suitable in any other described embodiment of the disclosure. Certain features described in the context of various embodiments are not to be considered essential features of those embodiments, unless the embodiment is inoperative without those elements.

All publications, patents and patent applications mentioned in this specification are herein incorporated in their entirety by reference into the specification, to the same extent as if each individual publication, patent or patent application was specifically and individually indicated to be incorporated herein by reference. In addition, citation or identification of any reference in this application shall not be construed as an admission that such reference is available as prior art to the present disclosure. To the extent that section headings are used, they should not be construed as necessarily limiting.

What is claimed is:

1. A network apparatus of a cellular network, the network apparatus comprising:
a processor configured to:
receive, from a first user equipment (UE) that is connected to the cellular network, a request to establish or decline a sidelink between the first UE and a second UE;
receive, from the first UE, connectivity state information, wherein the connectivity state information includes information on at least one of channel quality, connectivity, or timing of the first UE; and
instruct the first UE, based on the connectivity state information, to establish the sidelink between the first UE and the second UE, wherein instructing the first UE to establish the sidelink between the first UE and the second UE comprises instructing the second UE to maintain a cellular connection with the network apparatus in response to a timing difference between a local timing reference of the first UE and a local timing reference of the second UE being below a predefined threshold.

2. The network apparatus according to claim 1, wherein the request is received from the first UE following discovery of the second UE.

3. The network apparatus according to claim 1, wherein instructing the first UE to establish the sidelink between the first UE and the second UE further comprises instructing the first UE to maintain at least one of a downlink cellular connection or an uplink cellular connection with the network apparatus, wherein the sidelink utilizes a frequency band not used by the at least one of the downlink cellular connection or the uplink cellular connection.

4. The network apparatus according to claim 1, wherein the processor is further configured to:
report, to the first UE and through the first UE to the second UE, an offset with respect to an external time reference for a synchronization of the first UE with the second UE, wherein the external time reference is based on:
a global positioning system (GPS), or
a global navigation satellite system (GNSS), or
a coordinated universal timing (UTC), or
a pre-agreed time reference.

5. A method for instructing a user equipment (UE), the method comprising:
receiving, by a network apparatus, from a first UE that is connected to a cellular network, a request to establish or decline a sidelink between the first UE and a second UE;
receiving, by the network apparatus, from the first UE, connectivity state information, wherein the connectivity state information includes information on at least one of channel quality, connectivity, or timing of the first UE; and
instructing, by the network apparatus, the first UE, based on the connectivity state information, to establish the sidelink between the first UE and the second UE, wherein instructing the first UE to establish the sidelink between the first UE and the second UE comprises instructing the first UE to temporarily disconnect a cellular connection to the network apparatus and to use a timing information of the second UE, such that the first UE and the second UE synchronize according to the timing information of the second UE, wherein a timing difference between a local timing reference of the first UE and a local timing reference of the second UE is above a predefined threshold level.

6. A user equipment (UE) comprising:
a processor configured to:
send, to a network apparatus, a request to establish or decline a sidelink between the UE and a second UE;
send, to the network apparatus, connectivity state information, wherein the connectivity state information includes information on at least one of channel quality, connectivity, or timing of the UE; and
receive, from the network apparatus, based on the connectivity state information, an instruction to, establish the sidelink between the UE and the second UE, wherein the instruction to establish the sidelink between the UE and the second UE comprises an instruction to establish the sidelink using timing information provided by the network apparatus or another network apparatus, such that the UE and the second UE synchronize according to the timing information, wherein a timing difference between a local timing reference of the UE and a local timing reference of the second UE is above a predefined threshold level.

7. The UE according to claim 6, wherein the processor is further configured to send a request to establish or decline the sidelink to the second UE.

8. The UE according to claim 6, wherein the processor is further configured to reject a request to establish the sidelink from the second UE.

9. The UE according to claim 6, wherein the processor is further configured to:
measure external timing information from a signal received from the second UE;
compare the external timing information with timing information of the UE and determine a timing offset; and
update an internal timing information based on the timing offset.

10. The first UE according to claim 9, wherein the processor is further configured to communicate the internal timing information to the second UE, wherein the second UE is not connected to a same base station as the UE.

* * * * *

UNITED STATES PATENT AND TRADEMARK OFFICE
CERTIFICATE OF CORRECTION

PATENT NO. : 10,827,546 B2
APPLICATION NO. : 16/368420
DATED : November 3, 2020
INVENTOR(S) : Manolakis et al.

It is certified that error appears in the above-identified patent and that said Letters Patent is hereby corrected as shown below:

In the Claims

Column 26, Line 41: "The first UE according to claim 9, wherein the" should read -- The UE according to claim 9, wherein the --.

Signed and Sealed this
Nineteenth Day of April, 2022

Katherine Kelly Vidal
*Director of the United States Patent and Trademark Office*